A. HAY.
Car-Axle Box.

No. 26,352.

Patented Dec. 6, 1859.

Witnesses
William C Peckham
A S Kellogg

Inventor
Alexander Hay

UNITED STATES PATENT OFFICE.

ALEXANDER HAY, OF PHILADELPHIA, PENNSYLVANIA.

BEARING FOR RAILROAD AND OTHER MACHINERY.

Specification of Letters Patent No. 26,352, dated December 6, 1859.

*To all whom it may concern:*

Be it known that I, ALEXANDER HAY, of the city of Philadelphia and State of Pennsylvania, have invented a new and improved mode of constructing and securing the bearings of axles within the journal-boxes of locomotive-engines and railroad-cars and which is also applicable to all axles and all other shafting; and I do hereby declare that the following is a full and exact description thereof, reference being had to the accompanying drawings and to the letters of reference marked thereon.

Figure 1:
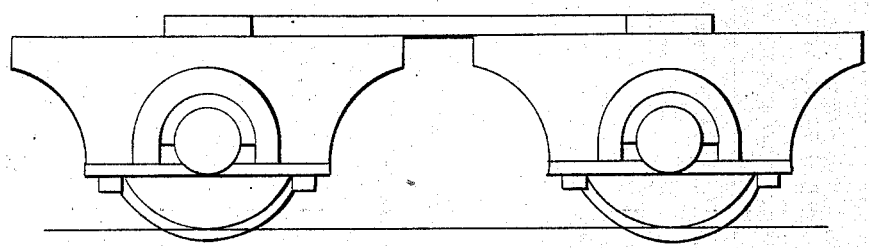

My invention consists in surrounding the bearings of railroad journal boxes with vulcanized india rubber or other suitable elastic material is applicable to any or all journal boxes. I therefore claim no particular mode of making the box itself. In ordinary railroad journal boxes, the bearing for the axle which is generally made of brass, or of brass lined with Babbitt metal, fits in and rests against the sides and top of the box, and being pressed up by the axle is thus held in place—see Figure 1, representing a common box. This leaves no play for the bearing which is thus confined by the journal box, and owing to the inequalities of the track and the curves on the road, subjects the bearings and also the axles to a great strain and pressure at particular points, which causes the bearings to wear unequally and rapidly. Many attempts have been made to remedy this but the appliances are complicated and expensive, and have not answered the desired purpose. To remedy these defects I embed or surround the bearing with vulcanized india rubber, or other suitable elastic material within the journal box, by interposing it between the bearing and sides, and top, and ends of the journal box, for the purpose of enabling the bearing to accommodate itself by yielding to every strain of the axle whether vertical, lateral, or end thrusts. In order completely to embed the bearing in the rubber, there should be room within the journal box sufficient to surround the bearing with the rubber, and thus accommodate the end play of the axle, as well as any lateral strain—the object being, to make the bearing move with the axle, and thus wear equally. The advantage of this will be readily acknowledged by any one who has observed how rapidly and unequally the bearings of locomotives and railroad cars now wear from the strains and torsion to which they are subjected in turning curves, and from the constant lateral motion of the train from one side of the track to the other, produced by the conical form of the flanges of the wheels. The thickness of the rubber surrounding the bearing, is only limited by the size of the bearing, and size of the journal box, and may even in ordinary boxes be interposed between the bearing and top of the box of sufficient thickness to make a good spring. If the bearings are oiled from the top of the box a metal tube should pass through the rubber to conduct the oil to the bearing.

Figure 3:
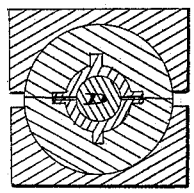
Figure 2:
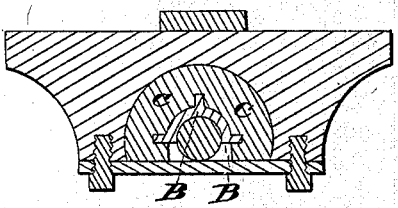

Fig. 1, represents a common journal box, the bearing fitting up close in the top of the box.—In Fig. 2, B, represents the bearing, and C, C, the india rubber in which it is confined. Fig. 3, shows the axle D, and the ring around this with the four small projections the journal box of a common carriage with the rubber outside of it.

I do not claim as my invention the interposing of india rubber with a view to prevent vibration for this has been done in compound rails for railroads, in railroad chairs, in railroad wheels between the tread and rim, and also at other points of the wheel, and also in common carriage wheels, &c &c.

My invention consists in providing a yielding motion for the bearing in every direction, in order to make it wear equally. It is applicable to all shafting, and as an incident to it, it tends to destroy the noise and jarring produced by the contact of metal surfaces.

To apply it to a common carriage wheel, the journal box should have a flange at each end, and the rubber be confined between the flanges and between the box and the outer circumference of the hub, so that when the wheel is placed on the axle and secured, the elasticity of the rubber will give to the journal box end play, for the rubber being secured within the hub, it cannot be pulled out, but upon thrusts being given the wheel either inwardly or outwardly, from running over stones the journal box would readily readjust itself. If the rubber around the journal box was made concave on its outer side, and the part of the hub in which it rests, convex, it could not by any pulling or thrusting of the axle be displaced, but in order so to place it, it may be necessary to make the hub in two parts. When arranged as above described, although the rubber is confined between the flanges on the ends of the journal box which is secured in the india rubber, it has every motion which the bearing for the railroad car has.

What I claim and desire to secure by Letters Patent is—

Embedding the bearings of journals or surrounding the same with india rubber or other suitable elastic material so as to cause them to yield in every direction when subjected to strains and thrusts and readjust themselves upon the pressure being removed substantially as described.

ALEXANDER HAY.

Witnesses:
WILLIAM C. PECKHAM,
A. S. KELLOGG.